Patented Mar. 20, 1951

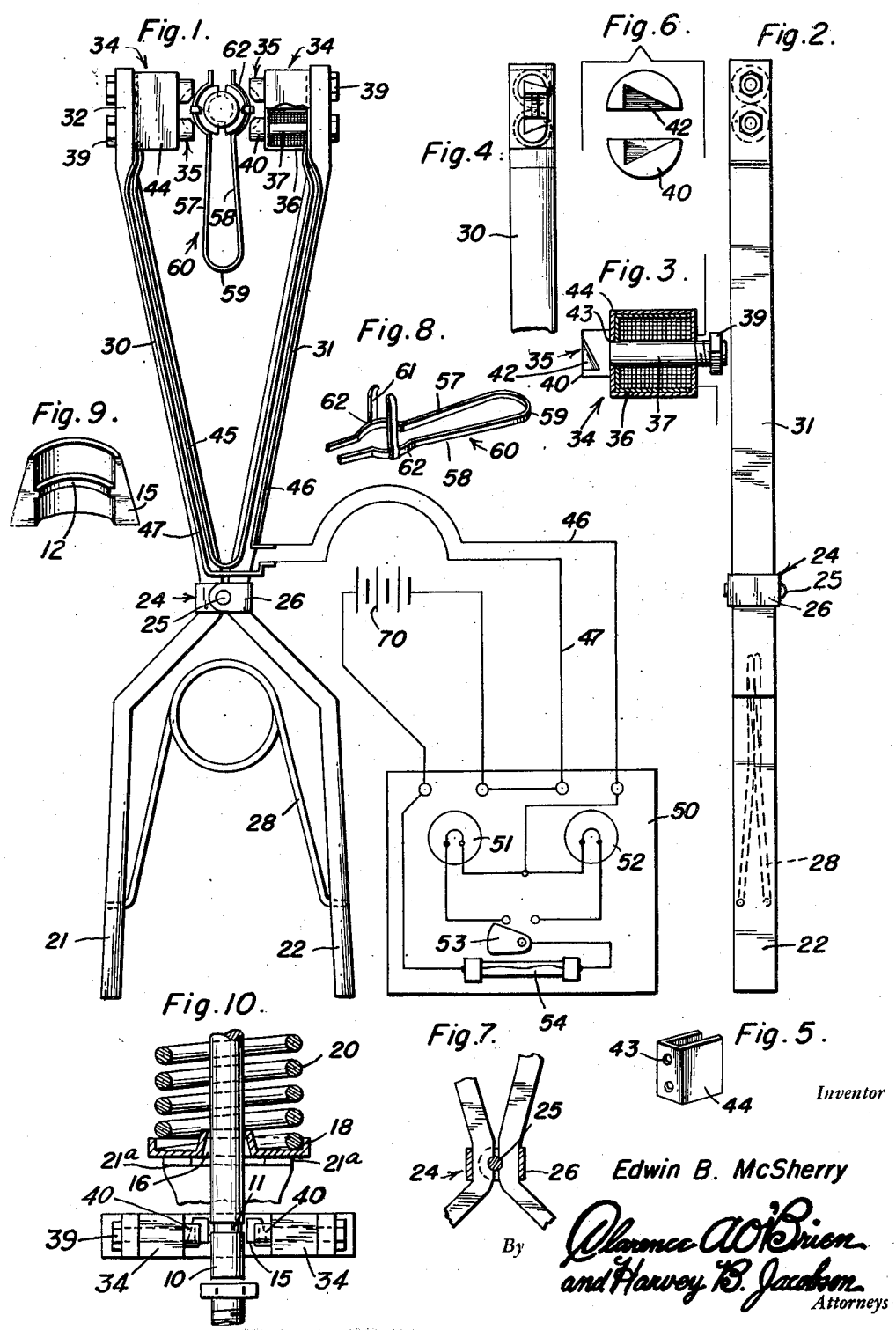

2,546,010

UNITED STATES PATENT OFFICE 2,546,010

TOOL ASSEMBLY FOR PLACING AND HOLDING LOCKING MEMBERS ON VALVE STEMS

Edwin B. McSherry, Leslie, Ark.

Application December 11, 1947, Serial No. 790,990

2 Claims. (Cl. 81—5.1)

This invention relates to tools for use in assembling machinery and it has particular reference to a tool designed to be employed in mounting or adjusting the valve springs of internal combustion engines.

In a large number of types of internal combustion engines the valves are operated by springs acting on the valve stem. A retainer or compressor disk takes up the elastic pressure of the spring and transmits it to the stem by means of so-called keepers, formed by the two halves of a split frusto-conical sleeve surrounding the stem and provided with a rib engaging a recess of the stem. The conical keepers are held firmly in a conical recess of the retainer disk by the spring pressure, but during the mounting, repair or regrinding of the valves the action of the spring has to be temporarily cut out, an operation usually performed by lifting the retainer disk from its seat. As the split frusto-conical sleeve thus looses its fixation it has to be removed and is replaced when the retainer disk is seated again. This operation is difficult to perform on account of lack of space and because the split sleeve has to be held until the recess of the retainer disk has closed in upon it, while the lack of space forces the mechanic performing this operation to loosen his grip before the retainer disk has actually reached this closing in position.

Special tools have therefore been designed to perform this operation most of them being of the plier type.

They have to be used concurrently with the tools for lifting the retainer disk from its seat and holding it and the timed relationship of their operation meets the same difficulties which have been mentioned above.

It is the primary object of this invention to provide an improved tool for placing and holding the keepers during the seating or reseating operation of the spring retainer until such operation has been completed.

It is a further object of the invention to provide a tool which is small, compact, inexpensive and is easily operated without requiring an unusual amount of experience or skill for its operation.

It is a further object of the invention to provide a tool which is capable of cooperating with an auxiliary device holding the keepers firmly until the recess of the retainer actually is in place and which is only removed by said retainer disk itself.

The inventive idea is capable of expressing itself in a variety of tool designs one of which for purposes of illustration is shown in the accompanying drawing. It is however to be understood that the tool shown in the drawing represents merely one of the embodiments of the invention by way of example, serving the purpose of explaining the principle thereof and one of the modes in which it is contemplated to apply that principle. Modifications of the embodiment shown are therefore not necessarily departures from the invention.

In the accompanying drawing:

Figure 1 is an elevational view of the tool.

Figure 2 is an elevational side view of the same.

Figures 3, 4, 5, 6 and 7 are views of details of the tool shown in Figures 1 and 2.

Figure 8 is a perspective view of the auxiliary holding appliance used in connection with the tool in the way illustrated in Figure 1.

Figure 9 is a perspective view of one of the keepers.

Figure 10 is an elevational partly sectional view of the valve stem, valve spring and spring retainer disk, with the spring lifting tool and the keeper placing and holding tool shown in their positions during their operation.

As above explained the tool according to the invention is used in connection with the mounting, repair, regrinding or the like of the valves of internal combustion engines. The valve stem 10 (Figure 10) carrying the valves (not shown) is provided with a circular groove or recess 11 into which the inwardly projecting ribs 12 (Figure 9) of the two keepers 15 are fitted. These keepers are the two halves of a split sleeve which, as a rule, is of frusto-conical shape. The keepers are held on the stem 10 by the conical recess 16 of the retainer disk 18 of the valve spring 20 (Figure 10) which surrounds the keepers when the retainer disk is seated.

During the mounting, repair grinding and during similar operations the valve is kept free from spring pressure by using a tool 21a which lifts and holds the retainer disk 18, while the two keepers 15 are removed. When spring pressure is again to be applied to the stem the keepers 15 have first to be brought into their place and have to be held there until the retainer disk can be slipped over them so as to hold them firmly.

The placing and holding of the two keepers 15 is performed by means of the tool shown in Figures 1 and 2. It comprises two handle bars 21, 22 joined by a pivot hinge 24 (Figure 7) consisting of a pivot bolt 25 and a hinge band 26. The handle bars may be spaced by a spring 28, which tends to move them apart and to keep the jaws or gripping arms 30, 31 closed.

These gripping arms 30, 31 are provided with flattened heads 32, carrying small electromagnets 34, the construction of which is shown in Figures 3 and 6. Each electromagnet comprises two soft iron cores 35 carrying coils 36. Each soft iron core 35 comprises a shank 37 which is screw threaded at one end so as to engage a nut 39. On the other side the core is provided with a head 40. The heads may be arcuate or semicircular in shape and each head is preferably provided with a triangular cut or recess 42. The heads and recesses of one side are preferably so spaced that the edge of the frusto-conical keepers may enter and may be in contact with the head 40 along a surface. This construction is especially preferable where the dimensions of the keepers are always approximately the same.

The shank 37 of the soft iron cores 35 are mounted on the heads 32 of the gripping arms by means of the nuts 39, with the heads 40 of the core projecting inwardly.

Each of the electromagnets 34 may be covered by a brass housing 44 provided with holes 43 through which the shanks 37 and heads 40 of the cores project.

The coils 36 on the two adjacent cores 35 are connected in series in the usual way and moreover the coils of the electromagnets on both sides of the tool may be connected in series by means of a conductor 45. The remaining conductors 46, 47 are joined to the power regulating device 50 which in the example shown is a simple device adapted to be used in connection with the battery 70 of a car. However any other manner of regulating the power supplied to the electromagnets is equally well suited. In the example illustrated two lamps 51, 52 are used as resistances together with a switch 53 which permits to cut out the current and either to connect one lamp in series with the supply circuit or to cut the resistance in half by using the two lamps in parallel. A fuse 54 may complete the arrangement.

The auxiliary device 60 for holding the keepers 15 is shown in Figure 8. It consists preferably of two arms 57, 58 joined by an elastic arc shaped bail 59 each provided with an arcuate or approximately semi-circular gripping jaw portion 62 for gripping the keepers. From the outer edge of said circular gripping portion an upstanding finger 61 projects. The fingers 61 may slightly converge towards each other. The dimensions of the gripping portions are so selected that gripping along the entire perimeter of the keepers will take place under the elastic tension of the bail 59. The auxiliary placement device 60 is of great advantage.

The use of the tool will be clear from the above description.

When the current is switched on usually only one contact of switch 53 is used. The gripping arms are opened by pressing the handle bars 21, 22 and the keepers 15 are first placed into their correct position on the heads 40. They are then placed into the correct position on the stem 10, by closing the gripping jaw holding them magnetically. The spring lifting tool may now be removed simultaneously with the gripping tool.

However this operation still requires some skill in timing. Therefore, the auxiliary holder 60 may be used. As soon as the keepers are seated the device 60 is drawn over the keepers after the switch 53 has been turned to the position in which the lamp circuits are in parallel and resistance is small. The ejector fingers 61 of the device 60 have been placed in such a position that they enter into the space between the electromagnet cores 35 and project towards the retainer disk. The arcuate portion 62 may even be squeezed in between the magnet heads and the keepers; this being however unnecessary if a sufficient length of the keeper projects from the electromagnets. The current is first weakened and then cut out and the electromagnetic tool is removed, the keepers being now held by the auxiliary device 60. The spring holding tool 21a is withdrawn from the spring retainer disk 18 approximately simultaneously with the withdrawal of the auxiliary holding device 60 after the disk 18 has been lowered as far as possible. Upon removal of the tools 21a and 60 the conical bore 16 of the disk 18 is slipped over the keepers under the pressure of the strong spring 20 before the two halves of the keeper come apart.

It will be manifest that minor changes of the construction will not affect the general principle of holding the keepers by means of an electromagnetic tool and by means of an auxiliary device ejected automatically during the seating operation.

Having described the invention, what is claimed as new is:

1. A tool assembly for holding the keepers of the valve spring retainers on the valve stem, comprising gripping arms, pivoted to each other and provided with handles for moving them towards and away from each other, electromagnets on each gripping arm facing each other, means for supplying said electromagnets with current, an auxiliary holding device adapted to be slipped over the keeper while held by the electromagnets on the gripping arms, the said auxiliary holding device being provided with ejector fingers projecting towards the valve spring retainers.

2. A tool assembly as claimed in claim 1, in which the auxiliary holding device comprises arcuate holding portions facing each other, resilient elastic legs for pressing the said portions towards each other, the said ejector fingers projecting from the said arcuate portions.

EDWIN B. McSHERRY.

REFERENCES CITED

The following references are of record in the file of this patent:

UNITED STATES PATENTS

| Number | Name | Date |
|---|---|---|
| 1,789,482 | Sunnen | Jan. 20, 1931 |
| 1,901,727 | Borland | Mar. 14, 1933 |

FOREIGN PATENTS

| Number | Country | Date |
|---|---|---|
| 413,783 | Great Britain | July 26, 1934 |